United States Patent
Sun

(10) Patent No.: US 8,370,653 B2
(45) Date of Patent: Feb. 5, 2013

(54) MOTHERBOARD CAPABLE OF PLAYING IMAGE OR VIDEO IN POWER-OFF STATE

(75) Inventor: Pei-Hua Sun, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 265 days.

(21) Appl. No.: 12/706,084

(22) Filed: Feb. 16, 2010

(65) Prior Publication Data

US 2010/0250976 A1     Sep. 30, 2010

(30) Foreign Application Priority Data

Mar. 27, 2009  (TW) .............................. 98110241 A

(51) Int. Cl.
 *G06F 1/00* (2006.01)
(52) U.S. Cl. ....................................... 713/300
(58) Field of Classification Search ................... 713/300
 See application file for complete search history.

(56) References Cited

U.S. PATENT DOCUMENTS

| 6,487,669 | B1 * | 11/2002 | Waring | ........................ | 713/324 |
| 2002/0158863 | A1 | 10/2002 | Huh et al. | | |

FOREIGN PATENT DOCUMENTS

| CN | 1208896 | A | 2/1999 |
| CN | 2569242 | | 8/2003 |
| CN | 1567337 | | 1/2005 |
| CN | 101022514 | | 8/2007 |
| JP | 7175449 | | 7/1995 |
| KR | 20030034354 | | 5/2003 |
| TW | I223743 | | 11/2004 |
| TW | I245982 | | 12/2005 |

OTHER PUBLICATIONS

Machine Translation of Chinese Patent Publication No. 101022514.*
English language translation of abstract of CN 1208896 A.
English language translation of abstract of JP 7175449 (published Jul. 14, 1995).
English language translation of abstract of KR 20030034354 (published May 9, 2003).
English language translation of abstract of CN 1567337 (published Jan. 19, 2005).
English language translation of abstract of CN 101022514 (published Aug. 22, 2008).
English language translation of abstract of CN 2569242 (published Aug. 27, 2003).
English language translation of abstract of TW 1245982.
English language translation of abstract of TW 1223743.

* cited by examiner

*Primary Examiner* — Thomas Lee
*Assistant Examiner* — Xuxing Chen
(74) *Attorney, Agent, or Firm* — Thomas | Horstemeyer, LLP

(57) ABSTRACT

A motherboard which can play an image or a video in a power-off state is disclosed. The motherboard includes a circuit board, a north bridge chipset, a digital photo frame chipset, and a switch unit. The north bridge chipset, the digital photo frame chipset, and the switch unit are disposed on the circuit board. The digital photo frame chipset is activated according to a stand-by power in the power-off state. The switch unit is electrically connected with the north bridge chipset and the digital photo frame chipset, respectively. The switch unit electrically communicates with the north bridge chipset or the digital photo frame chipset according to a triggering signal. The motherboard may utilize the stand-by power in the power-off state to display an image by a display device via the digital photo frame chipset and the north bridge chipset when a computer system is powered off.

12 Claims, 3 Drawing Sheets

MOTHERBOARD CAPABLE OF PLAYING IMAGE OR VIDEO IN POWER-OFF STATE

CROSS REFERENCE TO RELATED APPLICATIONS

This Non-provisional application claims priority under 35 U.S.C.§119(a) on Patent Application No(s). 098110241 filed in Taiwan, Republic of China on Mar. 27, 2009, the entire contents of which are hereby incorporated by reference.

BACKGROUND OF THE INVENTION

1. Field of Invention

The invention relates to a motherboard and, more particularly, to a motherboard which may utilize stand-by power of a computer system in a power-off state to operate and to play and display an image or a video on a screen.

2. Related Art

Since a digital camera becomes more and more popular, traditional photographs are gradually replaced by digital images or videos. Consequently, products such as a digital photo frame for playing the digital images or the videos are gradually developed. However, since the unit price of the digital photo frame is far higher than that of a conventional photo frame, the digital photo frame is not further popularized for a long time.

Generally speaking, a user is used to utilizing a computer to play the digital images or the videos. To utilize the computer to play the digital images or the videos, so long as the computer is in a power-on state, the display screen may play the digital images or the videos stored in a hard disk in the computer main body or an external storage device. The digital images or the videos may be played on the premise that the computer main body is powered on. When main power of the computer main body is off, and that is, a motherboard in the computer main body is in a power-off state, a processor for processing videos on the motherboard does not operate. Thus, the screen is incapable of receiving the image or video signal transmitted from the motherboard unless the computer reboots to enter a power-on state, the computer system is also incapable of playing the digital images or the videos, and the display screen is idle.

Considering an existing computer main body, the power outputted by the power supply disposed therein is usually hundreds of watts (W). If the computer is powered on only for playing the digital images or the videos, not only it is inconvenient to use, but also the power is consumed unnecessarily.

SUMMARY OF THE INVENTION

The invention provides a mother board which may utilize a stand-by power to play an image or a video when a computer system is in power-off state.

The invention provides mother board which can reduce power consumption and carbon dioxide emission to be consistent with a green design.

The computer system according to the invention provides a motherboard which also may utilize a stand-by power to play an image or a video when a computer system is in a power-off state, and it is connected with a display device to display the image. The motherboard includes a circuit board, a north bridge chipset, a digital photo frame chipset, and a switch unit. The north bridge chipset is disposed on the circuit board. The digital photo frame chipset is disposed on the circuit board and actuated according to the stand-by power in the power-off state. The switch unit is disposed at the circuit board and electrically connected with the north bridge chipset and the digital photo frame chipset, respectively, and the switch unit chooses to electrically communicate with the north bridge chipset or the digital photo frame chipset according to a triggering signal. When the motherboard is in the power-off state, the digital photo frame chipset and the switch unit utilize the stand-by power to be actuated and transmit an image signal or a video signal to the display device to play.

The motherboard according to the invention may further include a display connection port disposed at the circuit board and electrically connected with the switch unit. When the switch unit electrically communicates with the digital photo frame chipset, the switch unit electrically communicates with the display connection port.

The motherboard according to the invention may further include a memory unit disposed at the circuit board and electrically connected with the digital photo frame chipset. The memory unit stores the image signal or the video signal. The image signal or the video signal stored in the memory unit is outputted by the display connection port via the digital photo frame chipset and the switch unit.

According to an embodiment of the invention, the motherboard further includes a card reader port disposed at the circuit board and electrically connected with the digital photo frame chipset. The image signal or the video signal inputted by the card reader port is outputted by the display connection port via the digital photo frame chipset and the switch unit.

According to an embodiment of the invention, the digital photo frame chipset include a universal serial bus (USB) interface, and the image signal or the video signal inputted by the USB interface is outputted by the display connection port via the digital photo frame chipset and the switch unit.

Above all, the motherboard according to the invention includes a digital photo frame chipset, and a switch unit chooses the digital photo frame chipset or the north bridge chipset to output the image signal or the video signal corresponding to the power states of the motherboard. Consequently, even if the motherboard is in the power-off state, the user can still enjoy the image or the video stored in the memory unit or inputted via the card reader port or the USB interface via the display screen connected with the motherboard by utilizing the stand-by power in the power-off state via the digital photo frame chipset. As a result, it is more convenient for users to use it. Furthermore, the power of the stand-by power $P_{st}$ in the power-off state utilized by the digital photo frame chipset is smaller than ten watts and far lower than the power consumption (about hundreds of watts) of the motherboard in the power-on state, and thus the power consumption are also reduced. As a result, the power consumption and the carbon dioxide emission are reduced, which is consistent with a green design.

These and other features, aspects and advantages of the present invention will become better understood with regard to the following description, appended claims, and accompanying drawings.

DETAILED DESCRIPTION OF THE INVENTION

A motherboard which may utilize a stand-by power to play an image or a video in a power-off state is illustrated hereinafter accompanying relating drawings. The same component numbers denote the same components.

Figure 1:
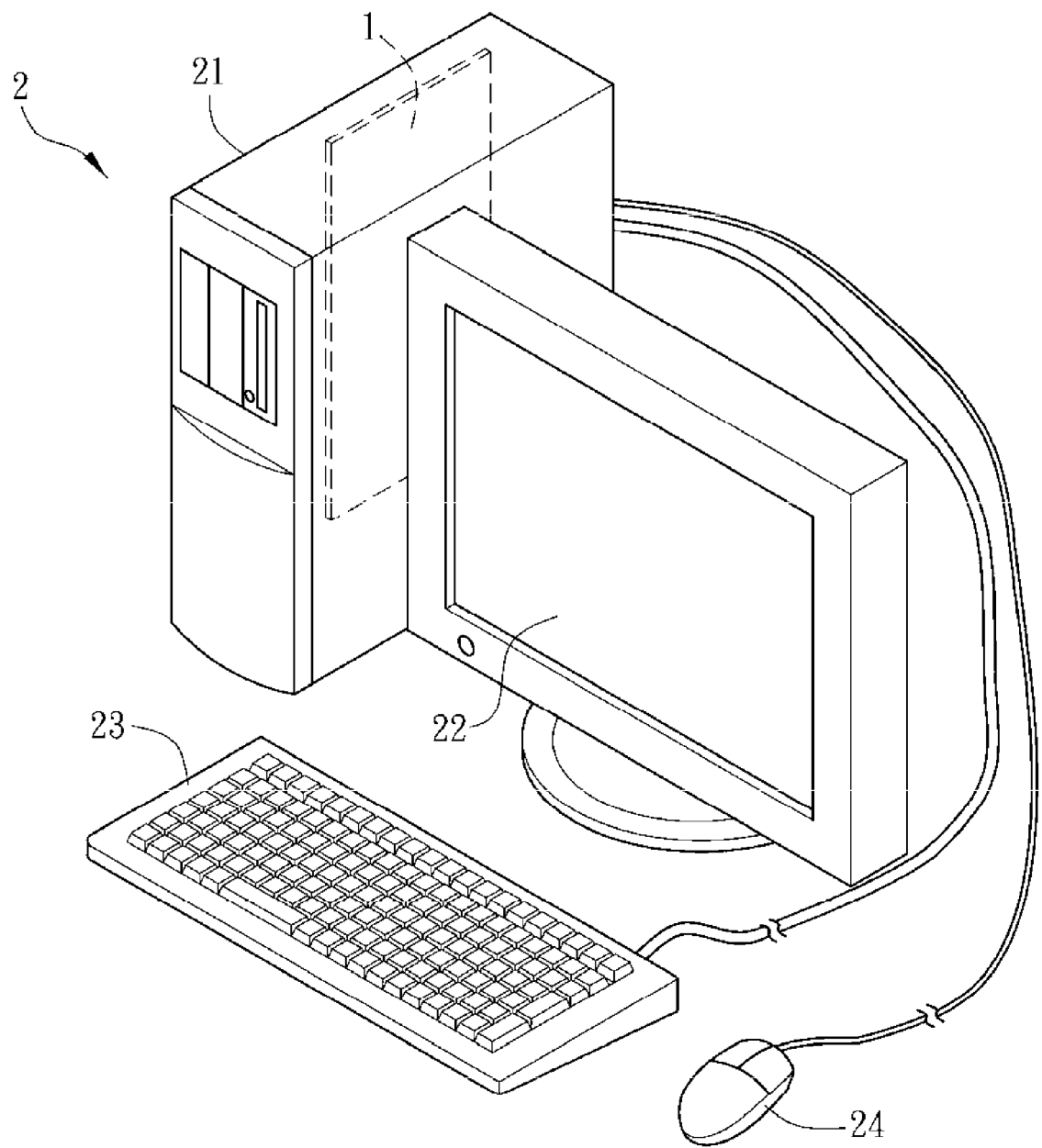
FIG. 1 is a schematic diagram showing an electronic device having a motherboard according to an embodiment of the invention.

FIG. 1 is a schematic diagram showing an electronic device 2 having a motherboard 1 according to an embodiment of the invention. The electronic device 2 may be a desktop computer, a notebook computer, a tablet computer, or an ultra mobile computer (UMPC). The desktop computer is taken as an example to illustrate the electronic device 2 according to the invention, but it should not be considered as limiting the invention. The electronic device 2 includes a main body 21, a display screen 22, a keyboard 23, and a mouse 24. The motherboard 1 is held in the main body 21. The display screen 22 may be a liquid crystal display (LCD), a plasma display panel (PDP), a field emission display (FED), an organic electroluminescent display (OELD), or a vacuum fluorescent display (VFD). The display screen 22, the keyboard 23, and the mouse 24 may be connected with different connection ports on the motherboard 1, respectively, to be taken as human-machine interfaces.

When the electronic device 2 is the tablet computer or the ultra mobile personal computers (UMPC), the main body, the display screen, and an input module (the keyboard or a touchpad) further may be integrated in a single housing.

Figure 2:
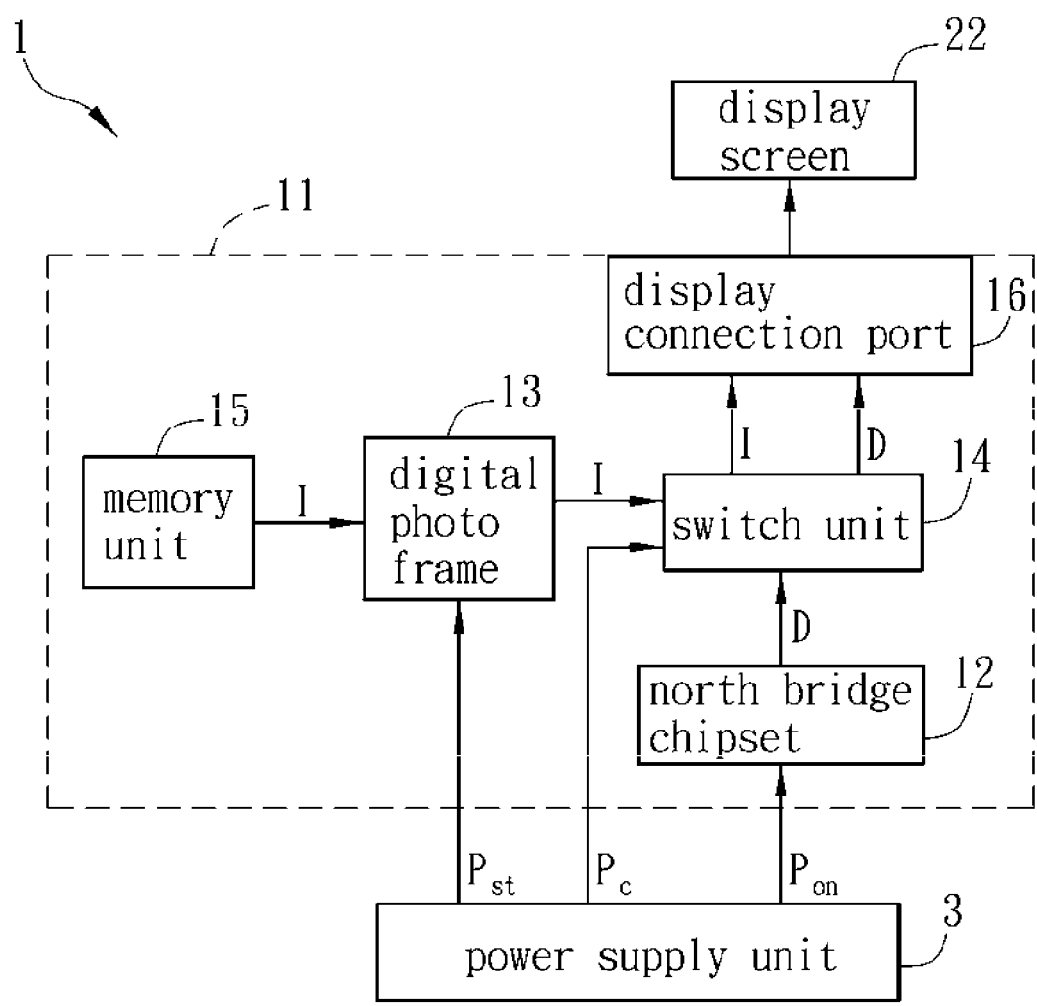
FIG. 2 is a block diagram showing a motherboard, a display screen, and a power supply unit according to an embodiment of the invention.

FIG. 2 is a block diagram showing the motherboard 1, a display screen 22, and a power supply unit 3 according to an embodiment of the invention, and it is for illustrating the configuration and the operation way of the motherboard 1 in detail.

The motherboard 1 includes a circuit board 11, a north bridge chipset 12, a digital photo frame chipset 13, and a switch unit 14. The motherboard 1 is further electrically connected with the power supply unit 3.

The north bridge chipset 12 and the digital photo frame chipset 13 are disposed on the circuit board 11, the north bridge chipset 12 may be actuated according to a power-on power source in a power-on state, and the digital photo frame chipset 13 may be actuated according to a stand-by power $P_{st}$ in the power-off state. The stand-by power means the power provided by the power supply unit 3 still connected with commercial power when the electronic device 2 is powered off.

The switch unit 14 is disposed on the circuit board 11 and electrically connected with the north bridge chipset 12 and the digital photo frame chipset 13, respectively. The switch unit 14 may include a single pole double throw (SPDT) switch element. The switch unit 14 chooses to electrically communicate with the north bridge chipset 12 or the digital photo frame chipset 13 according to a triggering signal $P_c$. The triggering signal $P_c$ may be a power good signal of a computer system, and it may represent that the motherboard 1 is in the power-on state or the power-off state via different voltage levels.

The triggering signal $P_c$ may be indirectly transmitted to the switch unit 14 via the north bridge chipset 12 or the digital photo frame chipset 13 or directly transmitted to the switch unit 14 by the power supply unit 3. In this embodiment, the triggering signal $P_c$ is directly transmitted to the switch unit 14 by the power supply unit 3, which is used for illustrating but not to be considered as limiting the invention.

Furthermore, in this embodiment, the motherboard 1 may further include a memory unit 15 and a display connection port 16, which is not interpreted as limiting the invention.

The memory unit 15 is disposed on the circuit board 11 and electrically connected with the digital photo frame chipset 13. The memory unit 15 stores at least an image signal I or at least a video signal. In this embodiment, the memory unit 15 stores the image signal I, which is used for illustrating but not to be considered as limiting the invention.

The display connection port 16 is disposed on the circuit board 11 and electrically connected with the switch unit 14. The motherboard 1 is connected with the display screen 22 via the display connection port 16. The display connection port 16 may be a D-sub interface, a DVI interface, a HDMI interface, or a display port interface.

Consequently, when the triggering signal $P_c$ received by the switch unit 14 represents that the motherboard 1 of the computer system is in the power-off state, and in other words, the main power of the motherboard 1 is off, the switch unit 14 and the digital photo frame chipset 13 are actuated to electrically communicate with each other using the stand-by power $P_{st}$. At the same time, the switch unit 14 is also electrically connected with the display connection port 16. The image signal I or the video signal stored in the memory unit 15 may be outputted by the display connection port 16 via the digital photo frame chipset 13 and the switch unit 14 to display the image or the video on the display screen 22.

Various kinds of settings (such as a play interval, an order, or special effects) about displaying the image signal I or the video signal for the digital photo frame chipset 13 may be preset when the motherboard 1 is in the power-on state, which should not be interpreted as limiting the invention, and the design mode may be different according to different demands. For example, all the settings may be built-in settings in the digital photo frame chipset 13.

Consequently, when the motherboard 1 is in the power-off state, the user may also enjoy the image signal I or the video signal stored in the memory unit 15 by utilizing the stand-by power $P_{st}$ in the power-off state via the digital photo frame chipset 13 and the display screen 22 connected with the motherboard 1. As a result, it is more convenient for users to use it. Furthermore, the power of the stand-by power $P_{st}$ in the power-off state utilized by the digital photo frame chipset 13 is smaller than 10 watts and far lower than the power consumption (about hundreds of watts) of the motherboard 1 in the power-on state. Thus, the power consumption is also reduced, and the effects of energy saving and reducing carbon dioxide emissions are obtained.

Additionally, when the triggering signal $P_c$ received by the switch unit 14 represents that the motherboard 1 is in the power-on state, and in other words, the motherboard 1 is in the power-on state, the switch unit 14 is actuated to electrically communicate with the north bridge chipset 12 via the power-on power source $P_{on}$. At the same time, the switch unit 14 also electrically communicates with the display connection port 16. As a result, the display screen 22 may display an image signal D outputted via a central processing unit (CPU) (not shown) and the north bridge chipset 12 on the motherboard 1.

Figure 3:
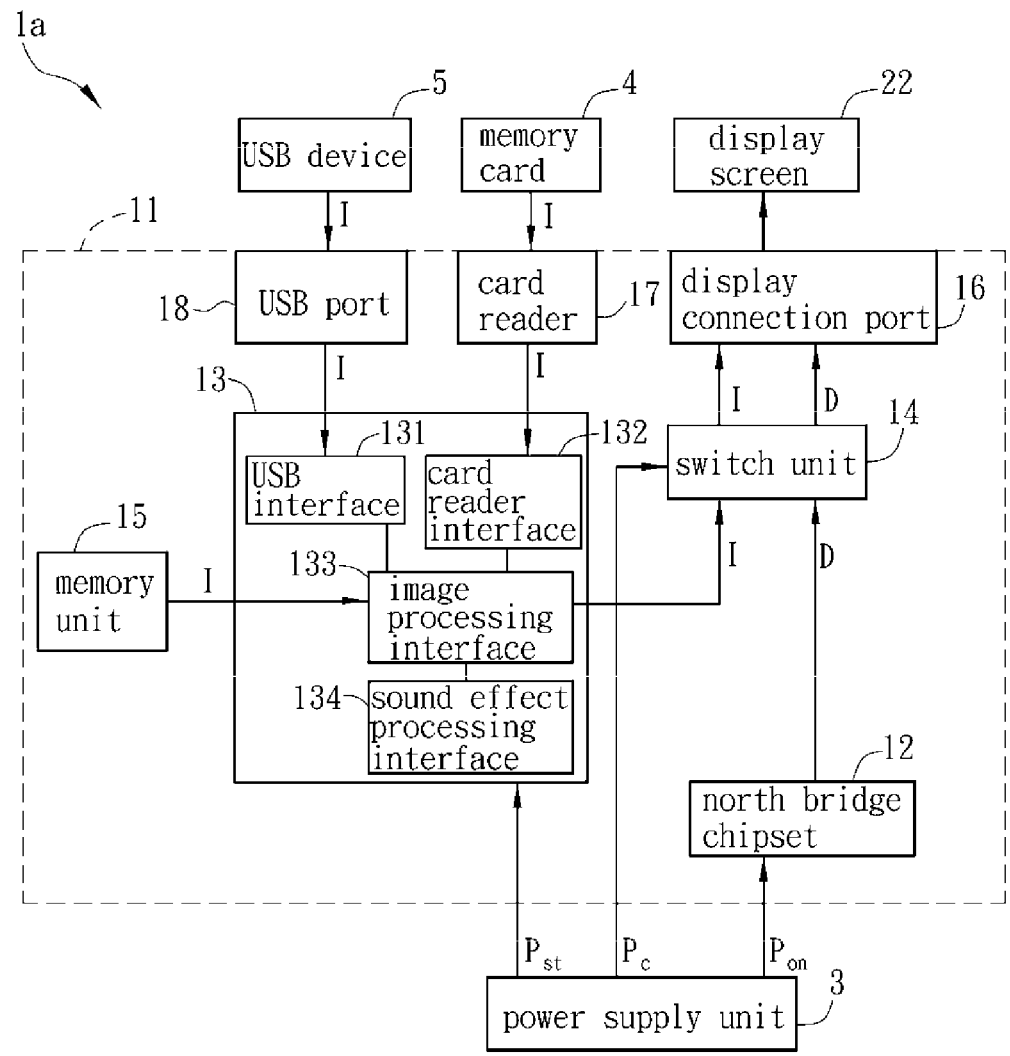
FIG. 3 is a block diagram showing a motherboard according to another embodiment of the invention.

FIG. 3 is a block diagram showing a motherboard 1a according to an embodiment of the invention. The main configuration and functions of the motherboard 1a and the motherboard 1 are the same. The difference between the motherboard 1a and the motherboard 1 is that the motherboard 1a may further include a card reader port 17 and a universal serial bus (USB) port 18.

The card reader port 17 is disposed on the circuit board 11 and electrically connected with a card reader interface 132 of the digital photo frame chipset 13. The USB port 18 is disposed at the circuit board 11 and electrically connected with a USB interface 131 of the digital photo frame chipset 13.

Additionally, the digital photo frame chipset 13 may further include an image processing interface 133 and a sound effect processing interface 134. The image processing interface 133 is electrically connected with the switch unit 14, and the sound effect processing interface 134 is electrically connected with the image processing interface 133.

Consequently, the user may utilize a memory card 4 such as a CF memory card, a DUO memory card, a MS memory card, a SD memory card, a SM memory card, a XD memory card, or a micro hard disk memory card to store the image signal I or the video signal and input the image signal I or the video signal to the card reader interface 132 by connecting the memory card 4 and the card reader port 17. Then, the image signal I or the video signal is processed by the image processing interface 133 (and the sound effect processing interface 134) of the digital photo frame chipset 13, and it is outputted to the display screen 22 by the display connection port 16 via the switch unit 14.

The user also may utilize a USB device 5 such as an external hard disk, a portable hard drive or other storage device to store the image signal I or the video signal and input the image signal I or the video signal to the USB interface 131 by connecting the USB device 5 and the USB port 18. Then, the image signal I or the video signal is processed by the image processing interface 133 (and the sound effect processing interface 134) of the digital photo frame chipset 13, and it is outputted to the display screen 22 by the display connection port 16 via the switch unit 14.

The memory unit 15, the USB interface 131, and the card reader port 17 may be disposed according to needs, or one or two of them may be disposed. In this embodiment, all the memory unit 15, the USB interface 131, and the card reader port 17 are disposed to illustrate the invention but not for limiting the invention.

To sum up, the motherboard according to the invention includes a digital photo frame chipset, and a switch unit chooses the digital photo frame chipset or the north bridge chipset to output the image signal or the video signal corresponding to the power states of the motherboard (the power-on state or the power-off state). Consequently, even if the motherboard is in the power-off state, the user can still enjoy the image or the video stored in the memory unit or inputted via the card reader port or the USB interface via the display screen connected with the motherboard by utilizing the stand-by power in the power-off state via the digital photo frame chipset. As a result, it is more convenient for users to use it. Furthermore, the power of the stand-by power $P_{st}$ in the power-off state utilized by the digital photo frame chipset is smaller than ten watts and far lower than the power consumption (about hundreds of watts) of the motherboard in the power-on state, and thus the power consumption is also reduced. As a result, the power consumption and the carbon dioxide emission are reduced, which is consistent with a green design.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A motherboard playing an image or a video in a power-off state by utilizing stand-by power, connected with a display device to display the image or the video, the motherboard comprising:
    a circuit board;
    a north bridge chipset disposed at the circuit board;
    a digital photo frame chipset disposed at the circuit board and actuated according to the stand-by power in the power-off state; and
    a switch unit disposed at the circuit board and electrically connected with the north bridge chipset and the digital photo frame chipset, respectively, wherein the switch unit chooses to electrically communicate with the north bridge chipset or the digital photo frame chipset according to a triggering signal,
    wherein when the motherboard is in the power-off state, the digital photo frame chipset and the switch unit utilize the stand-by power to be actuated and transmit an image signal or a video signal to the display device to play.

2. The motherboard according to claim 1, further comprising:
    a memory unit disposed at the circuit board and electrically connected with the digital photo frame chipset, wherein the memory unit stores the image signal or the video signal.

3. The motherboard according to claim 1, further comprising:
    a card reader port disposed at the circuit board and electrically connected with the digital photo frame chipset.

4. The motherboard according to claim 3, wherein the digital photo frame chipset has a card reader interface, and the card reader interface is electrically connected with the card reader port.

5. The motherboard according to claim 1, further comprising:
    a display connection port disposed at the circuit board and electrically connected with the switch unit, wherein the motherboard is connected with the display device via the display connection port.

6. The motherboard according to claim 1, wherein the digital photo frame chipset has an image processing interface, and the image processing interface is electrically connected with the switch unit.

7. The motherboard according to claim 6, wherein the digital photo frame chipset further has a sound effect processing interface, and the sound effect processing interface is electrically connected with the image processing interface.

8. The motherboard according to claim 1, further comprising:
    a universal serial bus (USB) port disposed at the circuit board and electrically connected with the digital photo frame chipset.

9. The motherboard according to claim 8, wherein the digital photo frame chipset has a USB interface, and the USB interface is electrically connected with the USB port.

10. The motherboard according to claim 1, wherein the power of the stand-by power in the power-off state is smaller than ten watts.

11. The motherboard according to claim 1, wherein the power-off state means that the power of the motherboard is off, and the digital photo frame chipset and the switch unit utilize the stand-by power to be actuated.

12. The motherboard according to claim 1, wherein a situation that the motherboard is in a power-on state means that the power of the motherboard is on, and the north bridge chipset and the switch unit utilize a power-on power source to be actuated.

* * * * *